US012465923B2

(12) United States Patent
Karadeniz et al.

(10) Patent No.: US 12,465,923 B2
(45) Date of Patent: Nov. 11, 2025

(54) METHOD FOR STARTING A GRINDING TUBE

(71) Applicant: Innomotics GmbH, Nuremberg (DE)

(72) Inventors: Adem Karadeniz, Erlangen (DE); Stefan Smits, Hemhofen (DE); Kurt Tischler, Erlangen (DE)

(73) Assignee: Innomotics GmbH, Nuremberg (DE)

( * ) Notice: Subject to any disclaimer, the term of this patent is extended or adjusted under 35 U.S.C. 154(b) by 555 days.

(21) Appl. No.: 16/316,514

(22) PCT Filed: May 23, 2017

(86) PCT No.: PCT/EP2017/062347
§ 371 (c)(1),
(2) Date: Mar. 8, 2023

(87) PCT Pub. No.: WO2018/010880
PCT Pub. Date: Jan. 18, 2018

(65) Prior Publication Data
US 2023/0182146 A1 Jun. 15, 2023

(30) Foreign Application Priority Data
Jul. 15, 2016 (EP) .................................... 16179745

(51) Int. Cl.
*B02C 25/00* (2006.01)
*B02C 17/00* (2006.01)
(Continued)

(52) U.S. Cl.
CPC .......... *B02C 25/00* (2013.01); *B02C 17/1805* (2013.01); *B02C 17/24* (2013.01); *B02C 17/00* (2013.01)

(58) Field of Classification Search
CPC ..... B02C 17/00; B02C 17/18; B02C 17/1805; B02C 17/24; B02C 25/00
(Continued)

(56) References Cited

U.S. PATENT DOCUMENTS 2,726,047 A * 12/1955 Treshow ................ B02C 17/24 451/85
2007/0145168 A1* 6/2007 Theberge ............... B02C 25/00 241/36
(Continued)

FOREIGN PATENT DOCUMENTS

CA 1188807 6/1985
DE 3528409 2/1987
(Continued)

OTHER PUBLICATIONS

PCT International Search Report based on PCT/EP2017/062347 dated Jul. 12, 2017.

*Primary Examiner* — Jared O Brown
*Assistant Examiner* — Matthew Stephens
(74) *Attorney, Agent, or Firm* — COZEN O'CONNOR

(57) ABSTRACT

A method for starting a grinding tube with an assigned drive device, wherein during the operation of the grinding tube a grinding mode and a charge release mode can be set such that a particularly reliable monitoring of the state of charge located in the grinding tube is ensured, where the grinding tube is rotated and, at a first rotational angle, a first actual torque is detected, a setpoint torque is calculated for a second, relatively large rotational angle based on the first actual torque, an actually occurring, second actual torque is detected when the second rotational angle is reached, an investigation is performed to determine the difference of the second actual torque from the setpoint torque, and the charge release mode of the grinding tube is set when the second
(Continued)

actual torque is within the threshold range, otherwise the grinding tube is operated in the grinding mode.

10 Claims, 2 Drawing Sheets

(51) Int. Cl.
*B02C 17/18* (2006.01)
*B02C 17/24* (2006.01)

(58) Field of Classification Search
USPC .................................................. 241/166, 176
See application file for complete search history.

(56) References Cited

U.S. PATENT DOCUMENTS

| | | | | |
|---|---|---|---|---|
| 2008/0169368 | A1 | 7/2008 | Becker et al. | |
| 2013/0327859 | A1* | 12/2013 | Holland .................. | H02P 25/24<br>241/36 |
| 2018/0169663 | A1* | 6/2018 | Boehnlein ............... | B02C 17/00 |

FOREIGN PATENT DOCUMENTS

| | | | |
|---|---|---|---|
| EP | 1735099 | | 12/2006 |
| EP | 2525914 | | 11/2012 |
| GB | 2011198 | | 7/1979 |
| RU | 2350392 | C2 | 3/2009 |
| RU | 2508166 | C1 | 2/2014 |
| RU | 2590831 | C2 | 7/2016 |
| WO | WO 01/03840 | | 1/2001 |

* cited by examiner

METHOD FOR STARTING A GRINDING TUBE

CROSS-REFERENCE TO RELATED APPLICATIONS

This is a U.S. national stage of application No. PCT/EP2017/062347 filed May 23, 2017. Priority is claimed on EP Application No. 16179745 filed Jul. 15, 2016, the content of which is incorporated herein by reference in its entirety.

BACKGROUND OF THE INVENTION

1. Field of the Invention

The invention relates to a control apparatus, a drive apparatus, a tube mill and a method for starting a grinding tube with an allocated drive apparatus, where a grinding mode and a charge release mode can be set during operation of the grinding tube.

2. Description of the Related Art

Tube mills are preferably used for grinding materials, such as ore. It is not unusual for the operation of a tube mill to be interrupted for a longer period of time and for the tube mill to be at a standstill. This happens due to maintenance reasons, for example. During the standstill of the tube mill, material located in the grinding tube of the tube mill can solidify and stick to the interior wall of the grinding tube. Material which has stuck, solidified and is adhering to the interior wall of the grinding tube in this manner is referred to as a "frozen charge". If the tube mill is brought back into operation after a longer standstill, there is the danger that the frozen charge detaches from the interior wall at a great height, falls and causes considerable damage to the tube mill when it subsequently strikes against the grinding tube.

EP 1735099 B1 disclosed a method for removing a frozen charge from the interior wall of a grinding tube, where the angle of rotation is set by a drive apparatus to oscillate by at least a predefined angle of rotation.

Monitoring facilities or monitoring functions in the controller of the tube mill already exist, which detect the presence of frozen charges and which shut down the tube mill when the presence of a frozen charge is detected. Such a monitoring of the load state of a tube mill is described for example in the unexamined German patent application DE 35 28 409 A1.

In the case of such a monitoring function, the torque required when starting up the tube mill can be continuously observed and the maximum value of the course is stored. When reaching the set angle of rotation of the monitoring (e.g., 70°), the current torque is compared with the stored peak value for a following time window. If the torque in the monitoring window is greater than 95% of the stored maximum value, then this implies a caked-on charge (in which the torque is continuously increased up to an angle of rotation of 90°) and the tube mill is shut down.

Particularly in the case of mills that are operated without using steel balls to aid grinding (AG mills, autogenous mills), the charge is relatively fluid, meaning that no pronounced torque peaks emerge on startup. Thus, the condition for shutdown is fulfilled by the monitoring, however, although there is no caked-on charge present. The mill is shut down nonetheless.

An automatic deactivation of the monitoring function described above does not make sense, however, as even in these mills there is the danger that the water located in the grinding tube drains off during standstill and the material subsequently cakes on. It is therefore not possible to dispense with the monitoring.

SUMMARY OF THE INVENTION

In view of the foregoing, it is an object of the invention to ensure a particularly reliable monitoring of the status of the material located in a grinding tube of a tube mill.

This and other objects and advantages are achieved in accordance with the invention by a method for starting a grinding tube with an allocated drive apparatus, where a grinding mode and a charge release mode can be set during operation of the grinding tube, and where, starting from a standstill state of the grinding tube, the grinding tube is rotated and, at a first angle of rotation, a first actual torque is acquired, based on the first actual torque a target torque is calculated for a second, greater angle of rotation, when the second angle of rotation is reached, an effective second actual torque is acquired, with the aid of a predefined threshold range, the extent by which the second actual torque deviates from the target torque is examined, and if the second actual torque lies within the threshold range, then the charge release mode of the grinding tube is set, otherwise, the grinding tube is operated in grinding mode.

The objects and advantages are further achieved in accordance with the invention by a control apparatus for the drive apparatus of a grinding tube for performing the method.

Moreover, the objects and advantages are achieved in accordance with the invention by a drive apparatus for a grinding tube, comprising a control apparatus of this kind.

Finally, the objects and advantages are achieved in accordance with the invention by a tube mill comprising a grinding tube and a drive apparatus of this kind.

The advantages and preferred embodiments disclosed below in relation to the method can be applied accordingly to the control apparatus, the drive apparatus and the tube mill.

The grinding mode is understood in this context as the normal operation of a tube mill, in which the grinding tube is rotated in view of crushing or pulverizing the charge.

The charge release mode is understood as an operating state of the tube mill in which, if a frozen charge is detected, measures for removing the frozen charge from the interior wall of the grinding tube are initiated. Such measures can follow the automated modes of operation described in EP 1 735 099 B1 and EP 2 525 914 B1. Alternatively, for example, there may only be provision for a shutdown of the rotation of the grinding tube in view of manually removing the frozen charge from the interior wall.

The invention is based on the consideration of checking, by acquiring the torque of the drive apparatus at two different angles of rotation, whether the charge of the grinding tube is a "sliding" or frozen material. In this context, the acquired torque is the drive torque (or alternatively the load moment) of the grinding tube. In principle, it holds that in the event of the entire charge forming a "frozen charge", at an angle of rotation of less than 90° the torque of the drive apparatus climbs constantly, as long as the charge adheres to the interior wall of the grinding tube. If, however, parts of the charge come loose on startup of the grinding tube and others still continue to adhere to the interior wall, the torque increase over time or as the angle of rotation increases is less than in the case of the total frozen charge.

Based on this knowledge, in accordance with the invention, the torque is acquired at two angles of rotation when starting up the grinding tube. In the case of the first, smaller angle of rotation, comparatively less of the charge has slid down on startup of the grinding tube. Based on the first actual torque, a calculation is performed to determine which torque is to be expected at the second, higher angle of rotation if the conditions in the grinding tube no longer change. The effective actual torque for the second angle of rotation is subsequently likewise acquired; as a rule, it lies below the extrapolated target value, because more material usually comes loose from the interior wall with increasing height of the charge during the further rotation of the grinding tube.

Finally, use is made of the threshold range, which makes a statement as to the extent by which the actual torque deviates from the target torque. If the second actual torque lies significantly below the extrapolated target torque, outside of the threshold range, then it is assumed that the charge has for the most part or even completely come loose from the interior wall of the grinding tube and the normal grinding operation of the tube mill can be continued. If, however, the second actual torque lies within the threshold range, then this means that the material is still adhering to the interior wall of the grinding tube for the most part. The charge release mode is therefore set, meaning that the charge is released from the wall before the grinding tube is rotated further.

By suitable selection of the threshold range, a very high reliability of the "frozen charge" detection is ensured, whereby the availability of the tube mill is likewise increased, because unnecessary shutdowns and thus production outages are avoided. A significant advantage of the proposed method is that the method is independent of a maximum value of the course of the torque. In addition, the expense for the realization of the method is minimal because, as a rule, all necessary measured variables are available in any case; they are merely implemented in a further software function in the controller of the tube mill. Moreover, the method is independent of the direction of rotation.

In accordance with a preferred development, in order to calculate the target torque, use is made of the sine of the first angle of rotation and the sine of the second angle of rotation, in particular the ratio of the sine of the first angle of rotation to the sine of the second angle of rotation. This is particularly advantageous because in the case of caked-on grinding product, the torque essentially rises according to a sine of the angle of rotation. A calculation of the target torque in the second angle of rotation, starting from the first angle of rotation, based on a sine-based extrapolation thus supplies the most accurate result for the target torque.

In accordance with a preferred embodiment, a quotient is formed from the second actual torque and the target torque. Such a quotient offers a particularly simple option for establishing a relationship between the two values, in order to examine how these interrelate or how great the difference is between the two. Alternatively to the quotient, for example, the difference is formed from the second actual torque and the target torque and this can likewise be compared with a predefined threshold range or threshold value.

In accordance with a further preferred embodiment, the threshold range is defined by a value that in particular is specified as a percentage or as a rational number. In this context, the value forms the number boundary for the ratio of the target torque and the second actual torque to one another. In the case where a quotient is worked with when evaluating the actual torque against the target torque, the quotient is always less than 1 if the actual torque is in the numerator and the target torque is in the denominator. In the opposite scenario, if in the case of the quotient the target torque is in the numerator and the actual torque is in the denominator, the quotient is always greater than 1. The threshold range is also selected accordingly.

Advantageously, the threshold range is defined as a deviation of the actual torque from the target torque by 15%, in particular by 10%, more particularly by 5%. In order to avoid unnecessary faults in the operation of the grinding tube, in this context, the threshold range is selected such that the charge release mode is only initiated if the deviation of the second actual torque from the target torque is minimal, which is a sign that on rotation of the grinding tube between the first angle of rotation and the second angle of rotation barely any material has come loose from the interior wall of the grinding tube.

Preferably, the first and the second angle of rotation lie below 90°, in particular below 70°. In accordance with the disclosed embodiments of the invention, with an angle of rotation of approx. 70°, the charge release mode is initiated to avoid the grinding product falling onto the bottom of the grinding tube. The aforementioned checking is therefore performed in an angular range of below 70°.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention will be described in greater detail with reference to the drawings, in which.

DETAILED DESCRIPTION OF THE EXEMPLARY EMBODIMENTS

Figure 1:
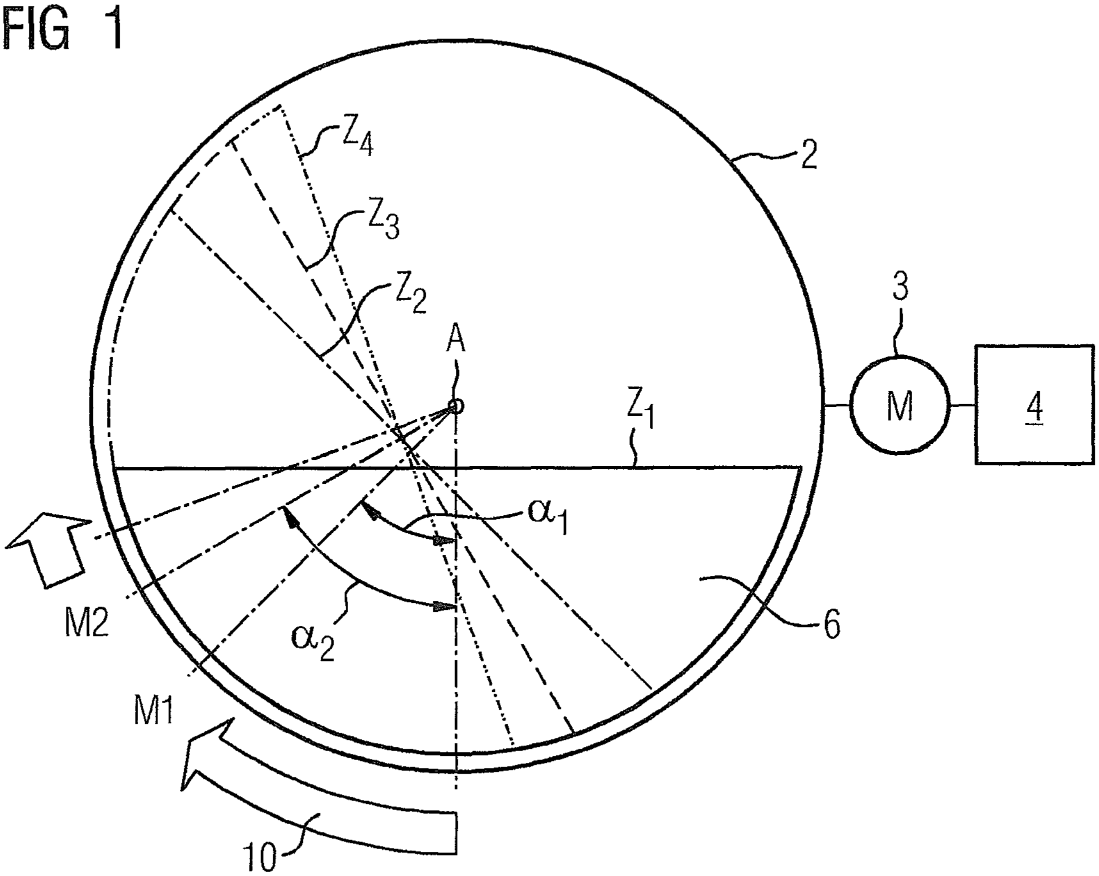
FIG. 1 shows a schematic and greatly simplified diagram of a grinding tube in four different angles of rotation in accordance with the invention.

The same reference characters have the same meaning in the figures.

In FIG. 1, a grinding tube 2 of a tube mill not shown in more detail here is represented symbolically. Allocated to the grinding tube 2 is a drive apparatus 3 with a control apparatus 4 including a processor and memory, which actuates inter alia the starting of the grinding tube 2. The grinding tube 2 is charged with a grinding product 6, in particular ore, which is furthermore referred to as charge.

The grinding tube 2 can be operated both in a grinding mode and also in a charge release mode. The grinding mode represents the normal operation of a tube mill, in which the grinding tube 2 is rotated in view of crushing or pulverizing the charge. The charge release mode is the operating state of the tube mill in which, if a frozen charge is detected, measures for removing the frozen charge from the interior wall of the grinding tube are initiated.

In FIG. 1, a total of four states of the charge 6 of the grinding tube 2 are shown according to angle of rotation. $Z_1$ represents a standstill state at 0°, in which the charge 6 is evenly distributed on the bottom on the grinding tube 2. $Z_4$ represents the position of the caked-on charge at an angle of rotation of approx. 70°. $Z_2$ and $Z_3$ represent the caked-on charge 6 at two further angles of rotation $\alpha_1$, $\alpha_2$ between 0° and 70°.

Starting from the standstill state $Z_1$, the operation of the tube mill is commenced and the grinding tube 2 is driven in the direction of rotation 10, in that it is rotated about a central axis A. At a first angle of rotation $\alpha_1$, which is smaller than 90°, for example at 45°, a torque T of the drive apparatus 3 is measured. This point is represented by M1 in FIG. 1. At a second angle of rotation $\alpha_2$, e.g. 60°, the torque T is measured again at point M2. The measurements can also occur at other angles of rotation D between 0° and 90°; only at least two measured values at two different angles of rotation are required.

Figure 2:
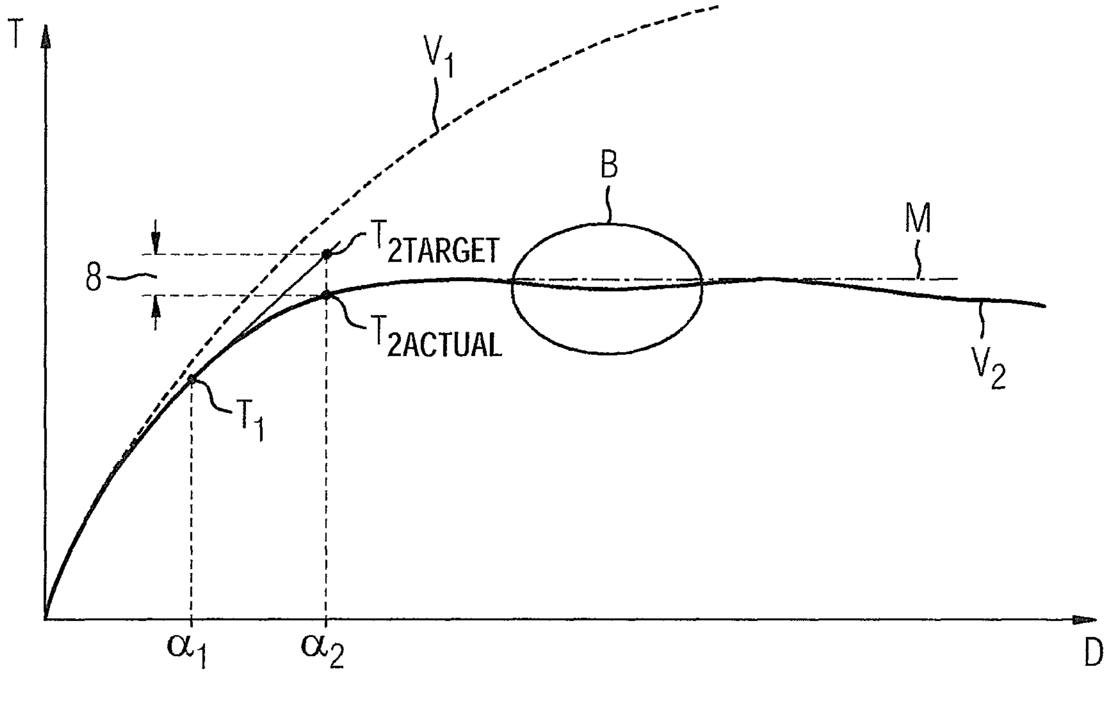
FIG. 2 shows an evaluation of the torque of the grinding tube in accordance with FIG. 1 as a function of an angle of rotation.

The evaluation of the measurements at the measurement points M1 and M2 is shown graphically in FIG. 2. In this context, the torque T of the drive apparatus 3 is plotted as a function of the angle of rotation D. $V_1$ refers to the increase in the torque T with a frozen charge. $V_2$ is the effective course of the torque T when starting the tube mill. M refers to the maximum torque that is occurring.

Within region B, which is used in the prior art for monitoring the "frozen charge", lies in the exemplary embodiment shown, a minimum deviation of the effective course $V_2$ of the torque T from the maximum torque M. Here, the course $V_2$ has no pronounced torque peaks. At this point, conventional monitoring systems would thus regularly initiate the charge release mode.

In order to avoid this, the torque T at the measurement points M1 and M2 is determined at $\alpha_1$ and $\alpha_2$, respectively. With caked-on grinding product 6, the torque T largely increases according to a sine of the angle of rotation D, as evident from the course of $V_1$. It is therefore possible to determine from the torque T1 at the first angle of rotation (measurement M1), using the relationship:

$$\sin(\alpha_1)/\sin(\alpha_2), \quad \text{Eq. 1}$$

the theoretical target torque $T_{2TARGET}$ at the point in time M2 at angle of rotation $\alpha_2$.

The effective torque $T_{2ACTUAL}$ at the measurement point M2 at $\alpha_2$ is additionally measured and compared with $T_{2TARGET}$, by making use of a threshold range 8. In the exemplary illustrated embodiment, the threshold range is defined as 10%, i.e., it is examined whether $T_{2ACTUAL}$ deviates more than 10% from $T_{2TARGET}$. If $T_{2ACTUAL}$ is more than 10% below $T_{2TARGET}$ or is equal to $T_{2TARGET}$, it should be assumed that the material has come loose from the interior wall of the grinding tube 2 and the tube mill is continued to be operated without faults. Otherwise, for example, the charge release mode is set, in particular the tube mill is shut down or use is made of a controlled rattling or shaking of the grinding tube 2 by way of adapting the drive torque.

To compare $T_{2TARGET}$ with $T_{2ACTUAL}$, the threshold range 8 is stored in the controller 4 or use is made thereof on demand in a case-related manner. For the evaluation, in particular, the quotient of $T_{2ACTUAL}$ and $T_{2TARGET}$ is formed and this is compared with the threshold range 8. In the above exemplary embodiment, in which the deviation boundary is defined at 10%, the condition for initiating the charge release mode is fulfilled when $$T_{2ACTUAL} < T_{2TARGET} \times 0.9. \quad \text{Eq. 2}$$

As $$T_{2TARGET} = T_1(\sin(\alpha(_1)/\sin(\alpha_2)), \quad \text{Eq. 3}$$

the following applies:

$$T_{2ACTUAL} < T_1(\sin(\alpha_1)/\sin(\alpha_2)) \times 0.9. \quad \text{Eq. 4}$$

With the angles of rotation $\alpha_1$=45° and $\alpha_2$=60° used in accordance with FIG. 1, the condition for the charge release mode can thus be expressed mathematically by:

$$T_{2ACTUAL} < T_1 \times 1.1. \quad \text{Eq. 5}$$

If $T_{2ACTUAL}$ is equal to or greater than $T_{2TARGET}$ by 10%, however, then the normal grinding mode is continued.

Figure 3:
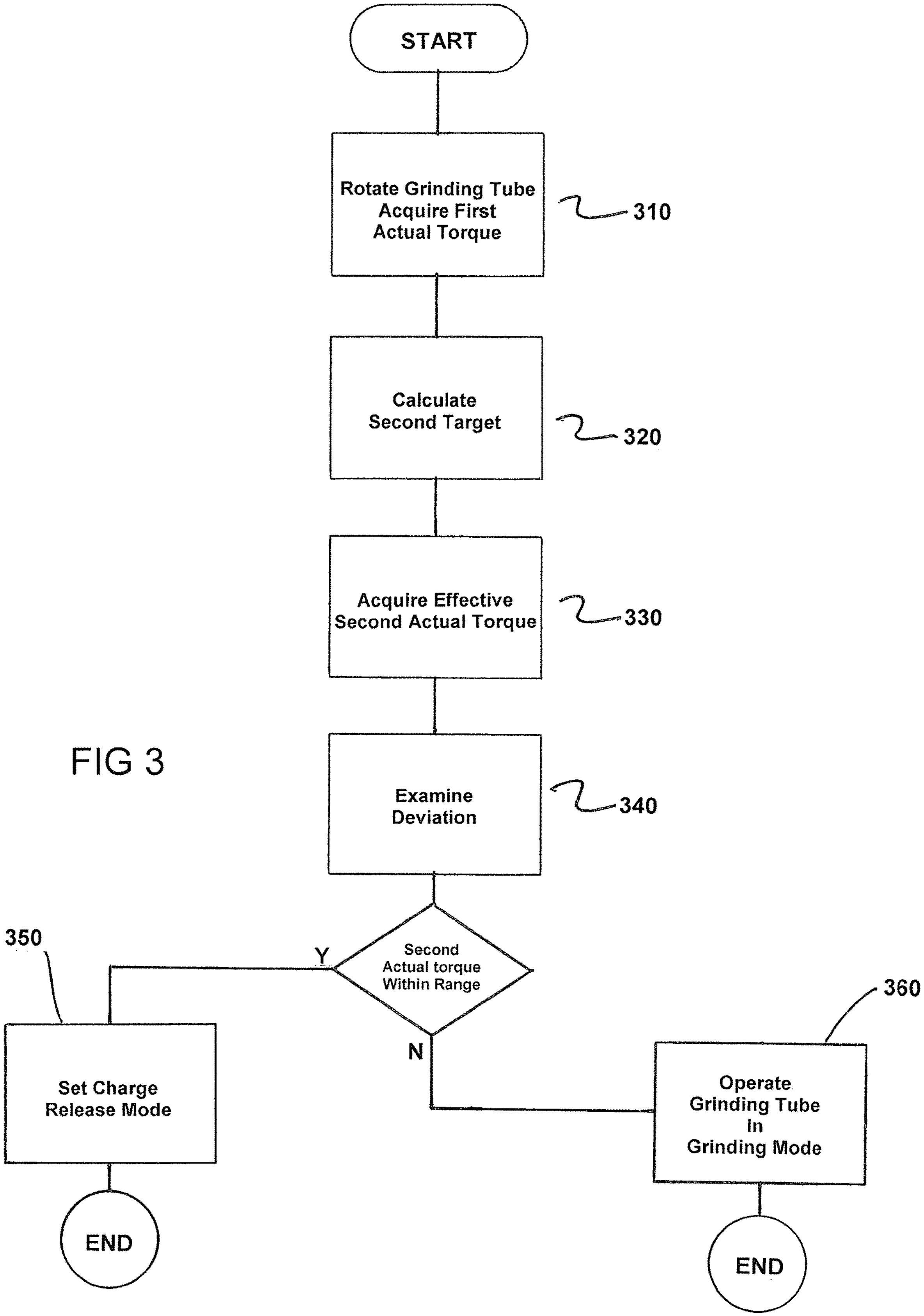
FIG. 3 is a flowchart of the method in accordance with the invention.

FIG. 3 is a flowchart of the method for starting a grinding tube 2 with an allocated drive apparatus 3, where a grinding mode and a charge release mode of during operation of the grinding tube 2 can be set. Starting from a standstill state of the grinding tube 2 the method comprises rotating the grinding tube 2 and, at a first angle of rotation $\alpha_1$, acquiring a first actual torque $T_1$, as indicated in step 310.

Next, a target torque $T_{2TARGET}$ for a second, greater angle of rotation $\alpha_2$ is calculated based on the acquired first actual torque $T_1$, as indicated in step 320.

Next, an effective second actual torque $T_{2ACTUAL}$ is acquired when the second angle of rotation $\alpha_2$ is reached, as indicated in step 330.

Next, examining an extent by which the second actual torque $T_{2ACTUAL}$ deviates from the target torque $T_{2TARGET}$ is examined while being aided by a predefined threshold range 8, as indicated in step 340.

Next, a charge release mode of the grinding tube 2 is set when the second actual torque $T_{2ACTUAL}$ lies within the threshold range 8, as indicated in step 350.

Next, the grinding tube 2 in grinding mode is operated when the second actual torque $T_{2ACTUAL}$ lies outside the threshold range 8, as indicated in step 360.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for starting a grinding tube from a standstill state of the grinding tube, said grinding tube including a drive apparatus, the method comprising:

rotating the grinding tube and, at a first angle of rotation, acquiring a first actual torque;

calculating, based on the acquired first actual torque, a target torque for a second, greater angle of rotation;

acquiring an effective second actual torque when the second angle of rotation is reached;

examining an extent by which the second actual torque deviates from the target torque and comparing the deviation to a predefined threshold range;

setting a charge release mode of the grinding tube when the second actual torque lies within the threshold range; and operating the grinding tube in grinding mode when the second actual torque lies outside the threshold range.

2. The method as claimed in claim 1, wherein a sine of the first angle of rotation and the sine of the second angle of rotation comprising a ratio of the sine of the first angle of rotation to the sine of the second angle of rotation is utilized to calculate the target torque.

3. The method as claimed in claim 1, wherein a quotient is formed from the second actual torque and the target torque.

4. The method as claimed in claim 1, wherein the threshold range is defined by a value specified as a percentage or as a rational number.

5. The method as claimed in claim 4, wherein the threshold range is defined as a deviation of the second actual torque from the target torque by 15%.

6. The method as claimed in claim 4, wherein the threshold range is defined as a deviation of the second actual torque from the target torque by 10%.

7. The method as claimed in claim 4, wherein the threshold range is defined as a deviation of the second actual torque from the target torque by 5%.

8. The method as claimed in claim 1, wherein the first and the second angles of rotation lie below 90°.

9. The method as claimed in claim 1, wherein the first and the second angles of rotation lie below 70°.

10. A tube mill, comprising:

a grinding tube;

a drive apparatus; and a control apparatus for the drive apparatus of the grinding tube, the control apparatus comprising:

a processor including memory;

wherein the control apparatus, starting from a standstill state of the grinding tube, is configured to:

cause the drive apparatus to rotate the grinding tube and, at a first angle of rotation, acquire a first actual torque;

calculate, based on the acquired first actual torque, a target torque for a second, greater angle of rotation;

acquire an effective second actual torque when the second angle of rotation is reached;

examine an extent by which the second actual torque deviates from the target torque and compare the deviation to a predefined threshold range;

set a charge release mode of the grinding tube when the second actual torque lies within the threshold range; and operate the grinding tube in grinding mode when the second actual torque lies outside the threshold range.

* * * * *